United States Patent [19]
Ziegler

[11] Patent Number: 5,800,012
[45] Date of Patent: Sep. 1, 1998

[54] IMPACT PAD FOR A SAFETY SEAT

[76] Inventor: Douglas K. Ziegler, 1350 W. Walnut St., Allentown, Pa. 18102

[21] Appl. No.: 890,357

[22] Filed: Jul. 9, 1997

[51] Int. Cl.$^6$ .......................................... B60N 2/42
[52] U.S. Cl. ................. 297/216.11; 297/256.15; 297/181
[58] Field of Search .............. 297/216.11, 216.1, 297/256.15, 250.1, 488, 487, 181

[56] References Cited

U.S. PATENT DOCUMENTS

| | | | |
|---|---|---|---|
| 3,874,476 | 4/1975 | Monaghan | 297/488 |
| 4,067,608 | 1/1978 | Von Wimmersperg | 297/216 |
| 4,076,307 | 2/1978 | Nanba et al. | 297/250 |
| 4,082,350 | 4/1978 | Tomforde | 297/243 |
| 4,159,127 | 6/1979 | Czernakowski et al. | 297/487 X |
| 4,190,288 | 2/1980 | Korger | 297/488 |
| 4,376,551 | 3/1983 | Cone | 297/250 |
| 4,429,916 | 2/1984 | Hyde et al. | 297/250 |
| 4,653,809 | 3/1987 | Czernakowski et al. | 297/487 |
| 4,729,600 | 3/1988 | Single et al. | 297/487 |
| 4,738,489 | 4/1988 | Wise et al. | 297/487 |
| 4,770,468 | 9/1988 | Shubin | 297/487 |
| 5,106,154 | 4/1992 | Kain | 297/250 |
| 5,538,322 | 7/1996 | Cone et al. | 297/256.15 |
| 5,607,203 | 3/1997 | Sedlack | 297/256.15 |

FOREIGN PATENT DOCUMENTS

| | | | |
|---|---|---|---|
| 2551843 | 3/1977 | Germany | 297/488 |

*Primary Examiner*—Milton Nelson, Jr.
*Attorney, Agent, or Firm*—Harold I. Masteller, Jr.

[57] ABSTRACT

A child's vehicle safety seat having an impact pad assembly rotatably attached to the safety seat. The impact pad assembly is rotatable toward or away from a child riding in the safety seat, and the assembly includes a padded portion upon which the child impacts during a vehicular event such as a collision. The impact pad assembly further includes an adjustable bias that applies a continuous force to rotate the impact pad assembly toward the seat portion. A stop limits the impact pad assembly rotation in order to place the padded portion at a riding position proximate to the child seated within the vehicle safety seat. The adjustable bias provides a mechanism to either increase or decrease the continuous force that rotates the impact pad assembly toward the riding position. The continuous force is adjusted to the weight of a child riding in the safety seat so that if the child's head and/or torso impacts upon the padded portion, the force of the impacting child is greater than the continuous force. The impact pad assembly will then rotate away from the force of the impacting child toward an impact position thereby reducing the shock of impact. As the impact pad assembly rotates away from the impacting child, toward the impact position, the bias applies and increasing resistance that slows the rotating impact pad assembly to a stopped impact position, and a releasable lock mechanism is engaged to prevent the bias from causing "impact pad spring-back" toward the riding position.

16 Claims, 5 Drawing Sheets

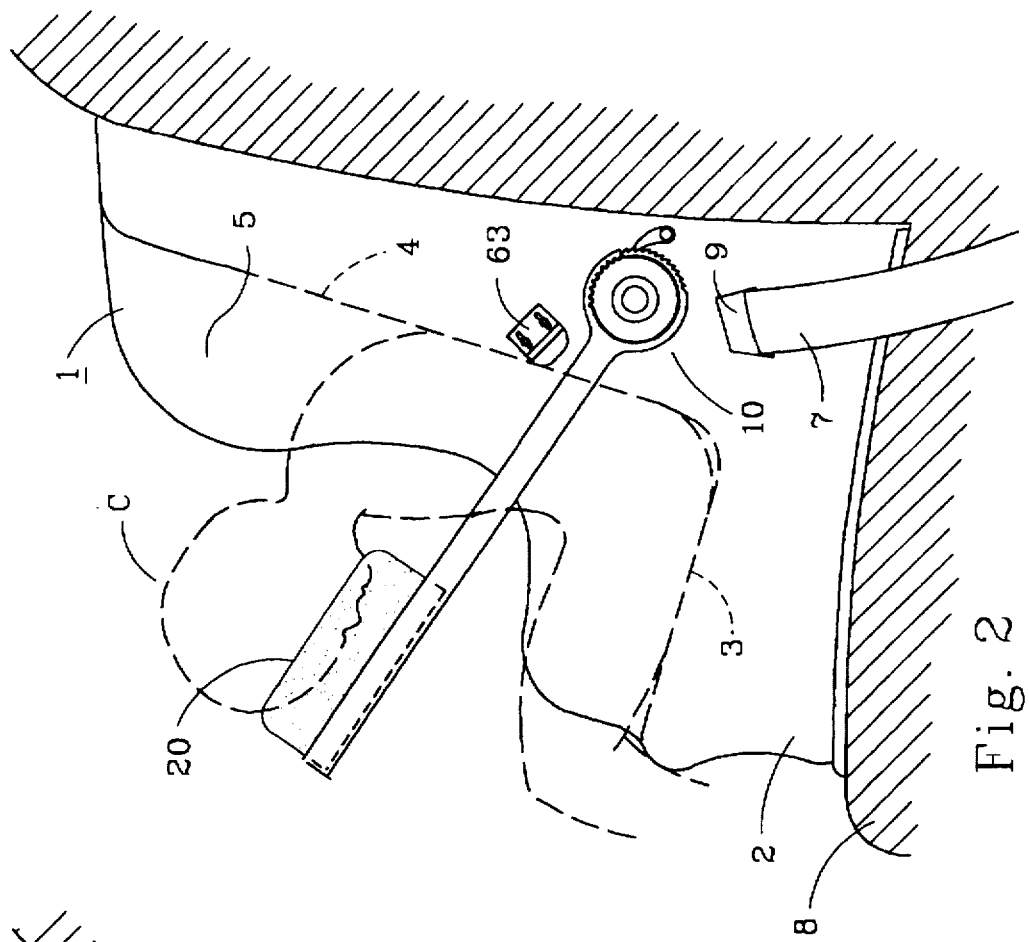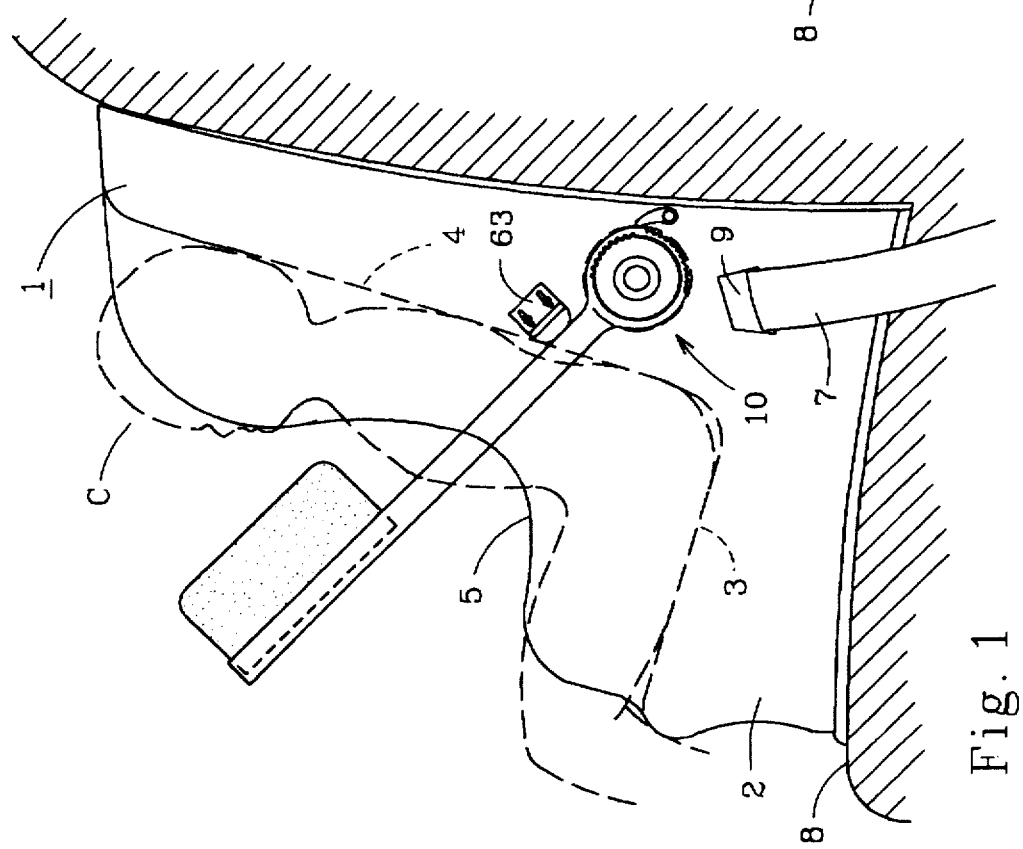

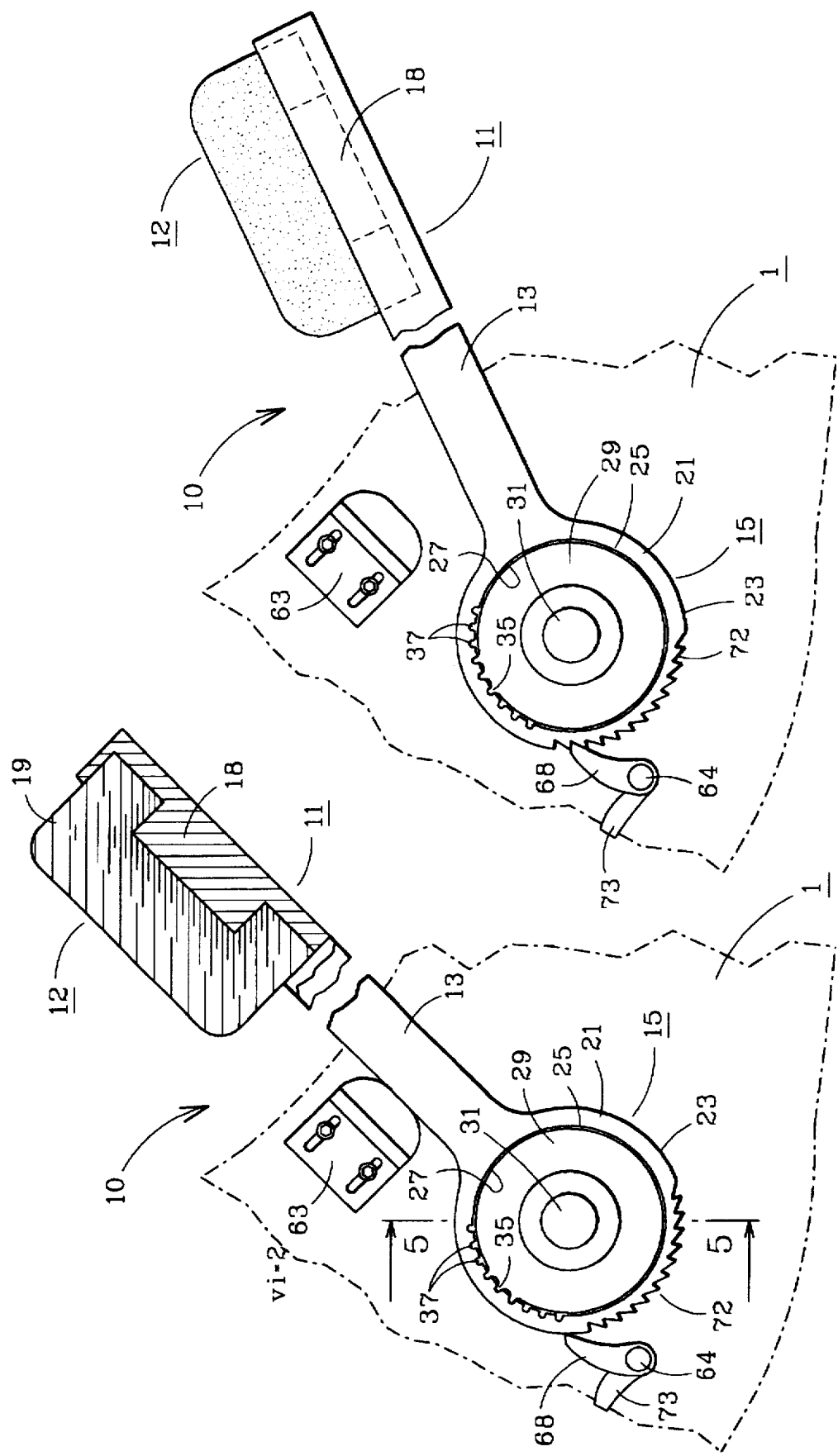

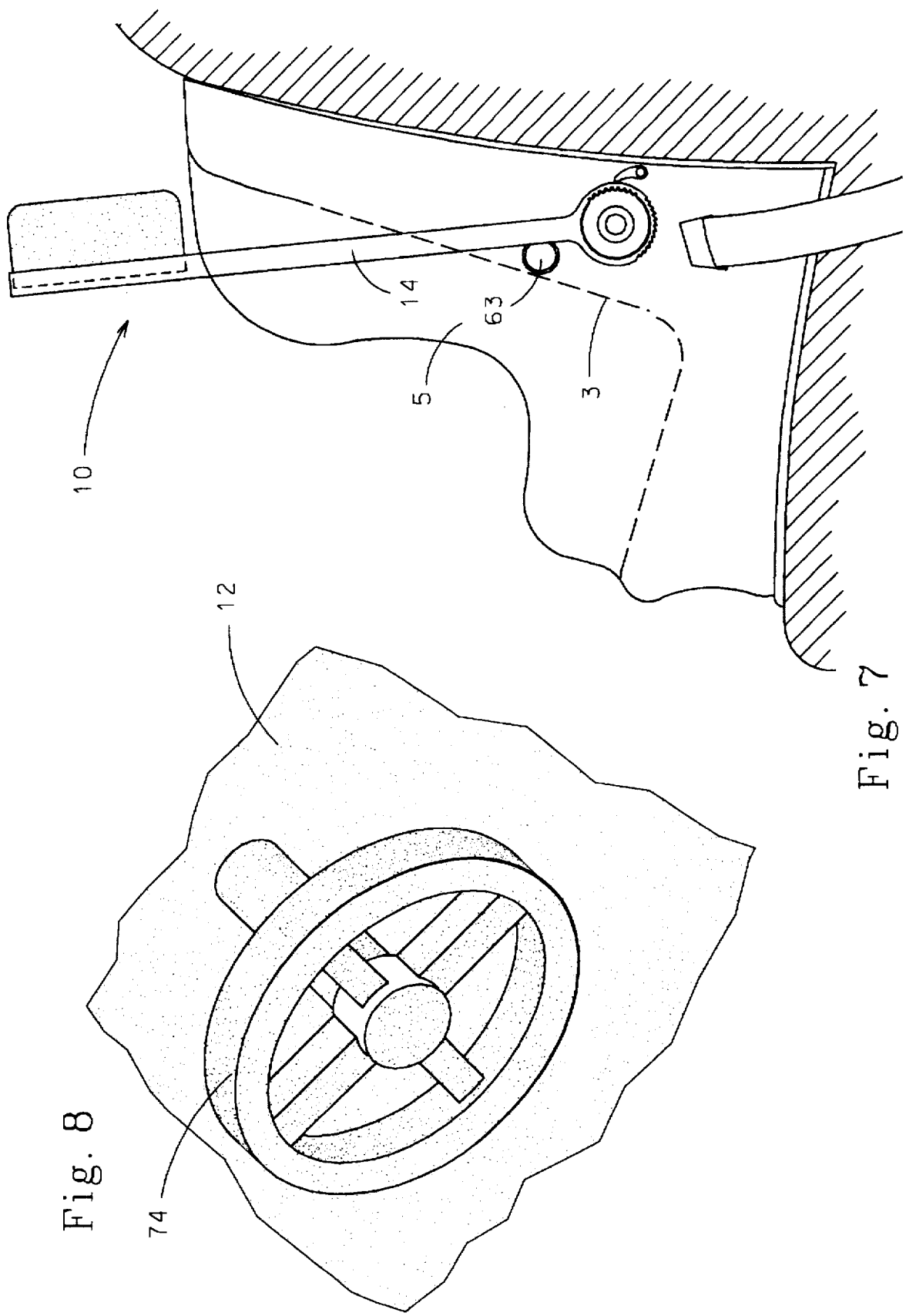

1

IMPACT PAD FOR A SAFETY SEAT

BACKGROUND OF THE INVENTION

The present invention relates to an improved safety seat for use in a vehicle, and in particular, it is directed to a child's safety seat having an energy absorbing impact pad upon which a child impacts during front end collisions to prevent hyperflexion and reduce head and/or neck trauma.

It is well known that in the United States, motor vehicle injury is common, and it is the leading cause of morbidity and mortality in young children. In the event of a front end collision, or any other unexpected event that causes a sudden deceleration in vehicle speed, the occupant in a moving vehicle is subjected to an increase in gravitational force, the phenomenon acting on any object that has mass and is situated within the earth's gravitational field. Because children have large heads and a higher center of gravity than an adult, in an abrupt stop an unrestrained child is propelled missile-like, head first into the dashboard, windshield or the like interior surface of the vehicle in which the child is riding. Vehicle safety seats are designed to prevent such a scenario, yet most injuries sustained by children riding in safety seats are still head and neck injuries. In a typical response to the rapid deceleration in a front end collision, the heavy head supported on a child's small body results in high torques being applied to the neck, and consequently, there is a high susceptibility for incurring, flexion-extension injuries.

The type and degree of injury sustained by a child involved in a moving vehicle accident depends upon several factors including ate of the child, speed of the vehicle, direction of the impact, and the child's restraint status. Vehicle speed, in combination with the mass of the child riding in the vehicle, determines the amount of gravitational (g) force exerted on the child during a collision.

It is well known that young children, about 8 years old and younger, are susceptible to flexion-extension injury with the application of relatively little force, and failure to provide a proper restraint system in a vehicle can cause great harm to a child during a vehicular event. Even minor decelerations can cause injury to a younger child because the cervical musculature is not yet fully developed. For example, the facet joints in C1 to C3 are nearly horizontal during the first several years of life and do not achieve adult orientation until 8 years of age. Immature uncovertebral joints at the C2 to C4 levels may not withstand flexion-rotation forces. And finally, the fulcrum of cervical movement is located higher in young children (C2–C3), as compared to adults (C5–C6). Therefore, younger children are more likely to receive cervical spine injuries during a crash.

Studies have shown that when children are properly restrained in a safety seat, they are less likely to be seriously injured during a collision than children who ride unrestrained. However, the properly restrained child can still sustain whiplash injury and/or head trauma as a result of the large forces that are generated during a crash. For example, in a 15 mph front end collision the head is accelerated forward with a force of about 10 "g," and the resulting whiplash injury (acceleration-deceleration movements of the neck), take place within about 250 milliseconds (ms). The forces involved in the whiplash mechanism acting, on the head and neck are surprisingly high. Research has shown that, depending upon the speed of the impacting vehicle and other variables such as body mass and direction of impact, forces within the range of about 5–30 "g" are possible.

Past designers of vehicle safety seats have recognized and have attempted to overcome the above problems by providing safety seats that include impact pads upon which a child's head impacts as it is accelerated in a forward direction during a front end collision. For example, Cone, et al. (U.S. Pat. No. 5,538,332), and Korger (U.S. Pat. No. 4,190,288), disclose impact pad arrangements that rotate to intercept the accelerating upper torso of a passenger during a collision. Such devices are undesirable because they further increase the "g" force during a vehicular event. The force of the rotating pad must be added to the force of the accelerating torso, and the combined forces increase the force of impact against the pad. Additionally both patents show impact pads that are positioned below the head level of the occupant riding in the safety seat. Such a low positioned pad will function as a fulcrum against the occupant's impacting upper torso, and it will cause the unrestrained head to further accelerate in a forward direction with a "g" force being applied as leverage to the top of the head.

Single, et al. (U.S. Pat. No. 4,729,600), and Wimmersperg (U.S. Pat. No. 4,067,608), show rigid impact pads upon which the child's head impacts as it is accelerated forward during an unexpected vehicular event. Such rigid type impact pads can provide some reduction in whiplash injury but they can cause head trauma. The sudden impact of a child's head upon a rigid unyielding pad at forces that range up to 30 "g" can cause concussions, skull fractures, soft tissue injury, and a variety of other possible head injuries.

U.S. Pat. No. 4,076,307 granted to Nanba, et al., discloses a safety chair having a cushion portion for absorbing impact shock exerted on a child's head, and a weakened frame portion that bends downward in response to an impact. The impact pad appears to overcome the problems of the Single and Wimmersperg rigid impact pad designs. Nanba, et al. absorbs the shock of impact by providing an impact pad that is supported on a frame that bends when the child's head impacts upon the cushion portion of the device. However, it must be remembered that "Force" is the product of "mass" times "acceleration" (F=ma). The inventors fail to recognize that children come in different sizes and shapes, and they fail to teach or even suggest a means for adapting their safety chair to different weight children. For example, if the frame of Nanba's safety chair is engineered to bend when a 40 pound child impacts upon the pad, a smaller, lighter weight child, will fail to bend the pad. In such instances Nanba's safety chair functions as a rigid unyielding, apparatus with respect to the smaller lighter weight child, and the safety chair will tend to cause head trauma as discussed in Single and Wimmersperg. Conversely, if a much larger heaver child, for example about 40 pounds in weight, is riding in the Nanba, et al. safety seat, the child's larger impacting head more easily bend the frame and simply push the cushion portion out of the way. Their heavier head will accelerate forward overtop the cushion in response to the force of the collision. Such a scenario will result in whiplash injury and/or head trauma.

SUMMARY OF THE INVENTION

It is therefore the primary object of the disclosed invention to provide a child's vehicle safety seat having an improved impact pad upon which the occupant impacts during a vehicular event that causes a sudden deceleration.

It is also an object of this invention to provide an improved impact pad that rotates in a direction away from the impacting occupant to reduce the force of impact.

It is also an object of this invention to provide an improved impact pad having a bias to provide a continuous force to rotate the impact pad in a direction toward a riding position proximate the occupant riding in the vehicle safety seat.

It is a further object of this invention to provide an adjustable bias that provides means to either increase or decrease the continuous force that rotates the impact pad in the direction toward the riding position.

It is another object of this invention to provide an improved impact pad where the bias provides an increasing resistance against rotating the impact pad in the direction away from the occupant, toward an impact position, the increasing resistance slowing the rotating impact pad to a stopped impact position.

It is still another object of this invention to provide a releasable lock to fasten the impact pad at a stopped impact position, the lock preventing impact pad spring-back toward the riding position.

And finally, it is still a further object of this invention to provide calibrated weight selector to adjust the bias to the weight of tile occupant riding in the vehicle safety seat.

Other objects and advantages of the present invention will become apparent from the following detailed description thereof.

In satisfaction of the foregoing objects and advantages the present invention provides a vehicle safety seat having an improved impact pad assembly rotatably attached to the safety seat. The improved impact pad assembly is rotatable toward or away from a child riding in the safety seat, and the assembly includes a padded portion upon which the child impacts during a vehicular event such as a front end collision. The impact pad assembly further includes an adjustable bias that applies a continuous force to rotate the impact pad assembly toward the seat portion. A stop limits the impact pad assembly rotation in order to place the padded portion at a riding position proximate the child seated within the vehicle safety seat. The adjustable bias provides a means to either increase or decrease the continuous force that rotates the impact pad assembly toward the riding position. The continuous force is adjusted to the weight of a child riding in the safety seat so that if the child impacts upon the padded portion, the force of the impacting head is greater than the continuous force. The bias adjusted impact pad assembly impact will then rotate away from the force of the impacting head toward an impact position thereby reducing, the shock of impact.

As the impact pad assembly rotates away from the impacting head, toward the impact position, the bias applies an increasing, resistance that slows the rotating impact pad assembly to a stopped impact position. When the rotating impact pad assembly slows to a stop, a releasable lock mechanism is engaged to prevent the bias from causing "impact pad spring-back" toward the riding, position.

BRIEF DESCRIPTION OF THE DRAWINGS

FIG. 1 is an elevation view of the present vehicle safety seat invention showing an occupant seated at a riding position.

FIG. 2 is an elevation view similar to FIG. 1 showing the occupant at the impact position illustrative of a response to a front end collision.

FIG. 3 is an enlarged view showing the present impact pad assembly at the riding position.

FIG. 4 is an enlarged view showing the present impact pad assembly rotated to the impact position.

FIG. 7 is an equivalent embodiment showing the impact pad assembly rotated to provide access to the seat portion of the vehicle safety seat.

FIG. 8 is an alternate embodiment showing an amusement device attached to the padded portion of the impact pad assembly.

DETAILED DESCRIPTION OF THE PREFERRED EMBODIMENT

Figure 5:
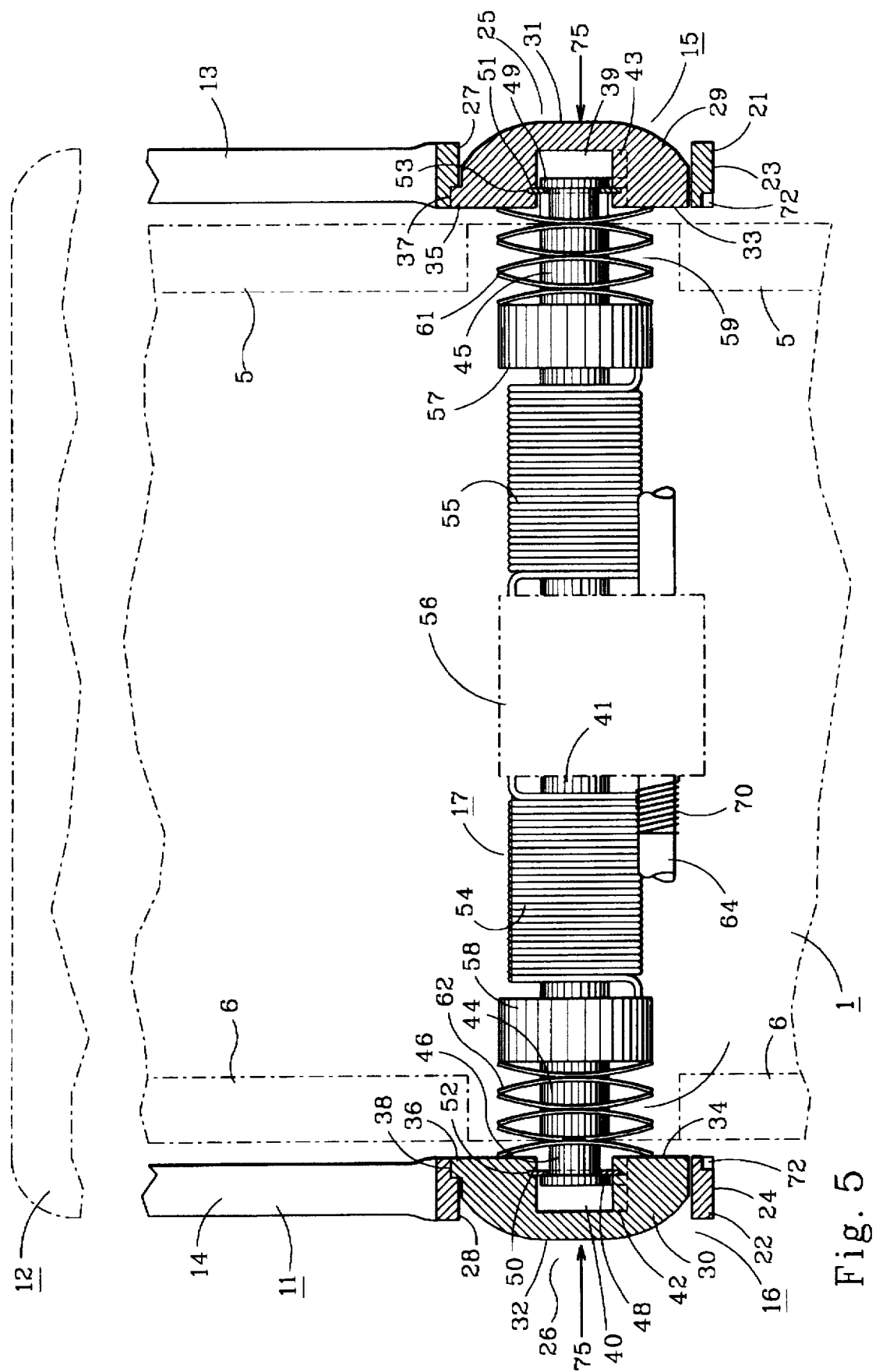
FIG. 5 is a transverse cross-section taken through the lines 5—5 of FIG. 3.

Referring to FIGS. 1 and 2 of the drawings, the preferred impact pad assembly 10 of the present invention is shown rotatably attached to a vehicle safety seat 1. The typical state-of-the-art vehicle safety seat includes a base portion 2, a seat portion 3, a backrest 4 that supports the head and upper torso of a child riding in the safety seat, and siderails 5 and 6 that extend along both sides of the seat portion 3 and backrest 4. The siderails 5 and 6 define a cavity that is shaped to loosely receive a child weighing up to about 90 pounds. Padding (not shown), may be placed within the cavity to provide a degree of comfort for the passenger, and a harness arrangement such as the 5-point harness arrangement well known in the art, is provided to hold but not restrain the forward motion of the child "C" seated within the vehicle safety seat. The safety seat 1 is removably fastened to the passenger seat 8 of a vehicle by latching the vehicle seat belts 7 tightly through openings 9 in the safety seat.

Even though such state-of-the-art vehicle safety seats have been designed to hold children securely within a moving vehicle, as heretofore described in the background of this invention, the prior designs have failed to adequately solve the well known problem of children having a high susceptibility to flexion-extension and head injuries during a vehicular event such as a front end collision, or any other incident that causes rapid deceleration in vehicle speed. In particular, the prior vehicle safety seat designs have completely failed to recognize the important need to provide a shock absorbing impact pad that can be adjusted to safely manage the wide range of impact forces generated by different weight children using the same safety seat design.

Referring to FIGS. 3 through 5, the impact pad assembly 10 consists of a "U" shaped member 11 that is rotatably attached to the siderails 5 and 6 of the vehicle safety seat 1 and includes a padded portion 12 extending between a pair of arms 13 and 14. The arms 13 and 14 having distal ends 15 and 16 fastened to a biased pivot mechanism 17 located between the siderail portions 5 and 6 of the safety seat.

The padded portion 12 of "U" shaped impact pad comprises a crossbar 18 extending between arms 13 and 14 and a multi-density pad 19 that covers the crossbar 18. The multi-density pad is shown in cross-section in FIG. 3 of the drawings Pad 19 provides a shock absorbing surface 20 upon which the child impacts as it is accelerated in a forward direction during a vehicular event see FIG. 2. The use of multi-density padding to cushion head impact and reduce injury is shown in co-pending U.S. application Ser. No. 08/814,381 by Dr. Ziegler, filed Mar. 11, 1997, the disclosure of which is hereby incorporated by reference. The multi-density padding in the earlier co-pending application, and the multi-density pad of the present invention, are similar in that they are both shock absorbing pads that comprise an increasing density in a direction away from the area upon which the child impacts. In the case of the present invention, pad 19 provides an increasing pad density in a direction away from the impact area 20, shown in FIG. 2, and toward the pad supporting crossbar 18.

The distal end portions 15 and 16 include enlarged ring gear like sections 21 and 22 having outer surfaces 23 and 24 and openings 25 and 26 defined by the inside surfaces 27 and 28. The inside surfaces 27 and 28 are shaped to receive and hold hubs 29 and 30 that are attached to the biased pivot mechanism 17.

Hub 29 includes an outer surface 31 that provides an exposed "press surface" within the opening 25 of the enlarged section 21. One or more gear like teeth 35 extend outward from hub 29 to engage corresponding, teeth 37 formed within the surface 27 of the ring gear like opening 25. Likewise, hub 30 also includes an outer "press surface" 32 exposed within the opening 26 of the enlarged section 22. One or more pear like teeth 36 extend outward from hub 30 to engage corresponding teeth 38 formed in the surface 28 of opening 26. The engaged teeth 35 and 37, and the engaged teeth 36 and 38, interlock the hubs 29 and 30 within the ring gear like openings 25 and 26 to frictionally engage the components and prevent rotation of the hubs therein.

Bored hole 39 and 40 extend inward from the inner surfaces 33 and 34 of the hubs 29 and 30 and both ends of a pivot-bar 41 are slidably fastened within the bored holes. The pivot-bar 41 extends between the siderails 5 and 6 of the vehicle safety seat 1, and it is rotatably supported by bearings or bushings at appropriate locations within the safety seat.

The pivot-bar 41 includes a first end portion 44 that extends outward from siderail 6 and includes a reduced diameter portion 46 and a hub retainer stop 48. Hub 30 is slidably attached to the first end portion 44 by a split ring hub retainer 50 fitted within a circumferential groove 52 milled in hole 40 of the hub. The hub retainer 50 loosely encircles the reduced diameter portion 46 to slidably capture hub 30 within the reduced diameter portion 46, and the retainer stop 48 prevents the hub from being pulled free from pivot-bar 41. The hub is keyed to the pivot-bar along key-way 42 to prevent the hub from rotating independent of the pivot-bar 41.

Similarly a second end portion 45 of the pivot-bar 41 extends outward from siderail 5 and includes a reduced diameter portion 47 and a hub retainer stop 49. Hub 29 is slidably attached to the second end portion 45 by a split ring hub retainer 51 fixed within a circumferential groove 53 in hole 39. The hub retainer 51 loosely encircles the reduced diameter portion 47 to slidably capture the hub 31, and the hub retainer stop 49 prevents the hub from being pulled free from pivot-bar 41. Hub 31 is also keyed pivot-bar along a key-way 43 to prevent hub rotation independent of the pivot-bar 41. The bearings (not shown) enable the pivot-bar 41 to rotate smoothly in either a clockwise or counter-clockwise direction, and the "U" member 11, attached to hubs 29 and 30, follows the rotating pivot-bar.

A bias mechanism 17 is provided to apply a continuous force that rotates the pivot-bar 41 and attached "U" shaped member 11 in a direction toward the seat portion 3 of the vehicle safety seat. As shown in FIGS. 1 and 3, adjustable tops 63 are attached to the siderails. The stops engage the "U" shaped member 11 to prevent further rotation movement when the "U" shaped reaches a "riding position," a position where the impact pad portion 12 is inclined at an angle of about a 45° with respect to the safety seat.

Referring now to FIG. 5, in the preferred embodiment, the bias mechanism includes a pair torsion springs 54 and 55 that encircle the pivot-bar 41. The pivot-bar extends through a support block 56 formed within the vehicle safety seat 1 and the pivot-bar includes a pair of spring retainers 57 and 58 located on opposite side of the support block 56. Torsion spring 54 is positioned between and fastened to the support block 56 and the spring retainer 58. The opposite torsion spring 55 is positioned between and fastened to support block 56 and the opposite spring retainer 57.

During assembly, the torsion springs 54 and 55 are pre-loaded to apply a continuous, and calculated, rotational force against the pivot-bar 41 in a direction that will cause the "U" shaped member 11 to be rotated toward the riding position. The torsion springs are pre-loaded to exert a rotational force that is adjusted for the weight of a child beginning at about and 20 pounds. A pair of bias adjustments, shown generally at 59 and 60, provided means to either increase or decrease the continuous rotational force in order to "fine tune" the bias mechanism 17 to fit a specific child's weight. For example, the bias adjustments 59 and 60 could be calibrated in a series of 5 pound increments beginning at about 20 to 25 pounds and ending at about 85 to 90 pounds.

Bias adjustment 59 includes a plurality of spring washers 61, such as Belleville disk springs, that extend along a length of the pivot-bar 41 between the spring retainer 57 and the inside surface 33 of hub 29. Adjustment 60 also includes a plurality of spring washers 62 positioned along the pivot-bar 41 between spring retainer 58 and the inside surface 34 of hub 30. The spring washers exert an outward force against the hubs 29 and 30 to keep the hub teeth 35 and 36 engaged with the ring, teeth 37 and 38, and to keep the hubs 29 and 30 interlocked with the ring shaped sections 21 and 22.

A lock mechanism comprising a lock-bar 64 that extends between the siderails 5 and 6 of the vehicle safety seat 1. The lock-bar is rotatably supported by bearings or bushings (not shown), located in the safety seat, and the lock-bar 64 includes opposed ends that extend outward from the siderails 5 and 6. A pawl 68 is fastened to each end of the lock-bar, and the pawls 68 are positioned to ride along the outer surfaces 23 and 24 of the enlarged ring sections 21 and 22. A spring 70 rotates the lock-bar in a direction to cause the pawls to bear against the outer surfaces of the enlarged sections 21 and 22 as shown in FIGS. 3 and 4.

Lock teeth 72 extend along a portion of the outer surfaces 23 and 24 at a location that will cause the pawls 68 to engage the teeth when the "U" shaped member 11 is rotated to an "impact position," a direction away from the seat portion 3 of the vehicle safety seat. The location of the lock teeth, along the outside surfaces 23 and 24 of the ring sections, is predetermined so that the pawls 68 and lock teeth 72 engage at a position where the force of impact can no longer rotate the impact pad assembly toward the impact position. At this point the pawls lock the impact pad assembly at a stopped impact position as shown in FIGS. 2 and 4. The locked impact pad assembly 10 prevents the padded portion from springing back toward the child resting upon the pad.

At least one release lever 73 is attached to the lock mechanism to provide means for disengaging the pawls 68 from the lock teeth 72 and to allow the bias mechanism 17 to rotate the impact pad assembly 10 back to the riding position shown in FIG. 1.

Figure 6:
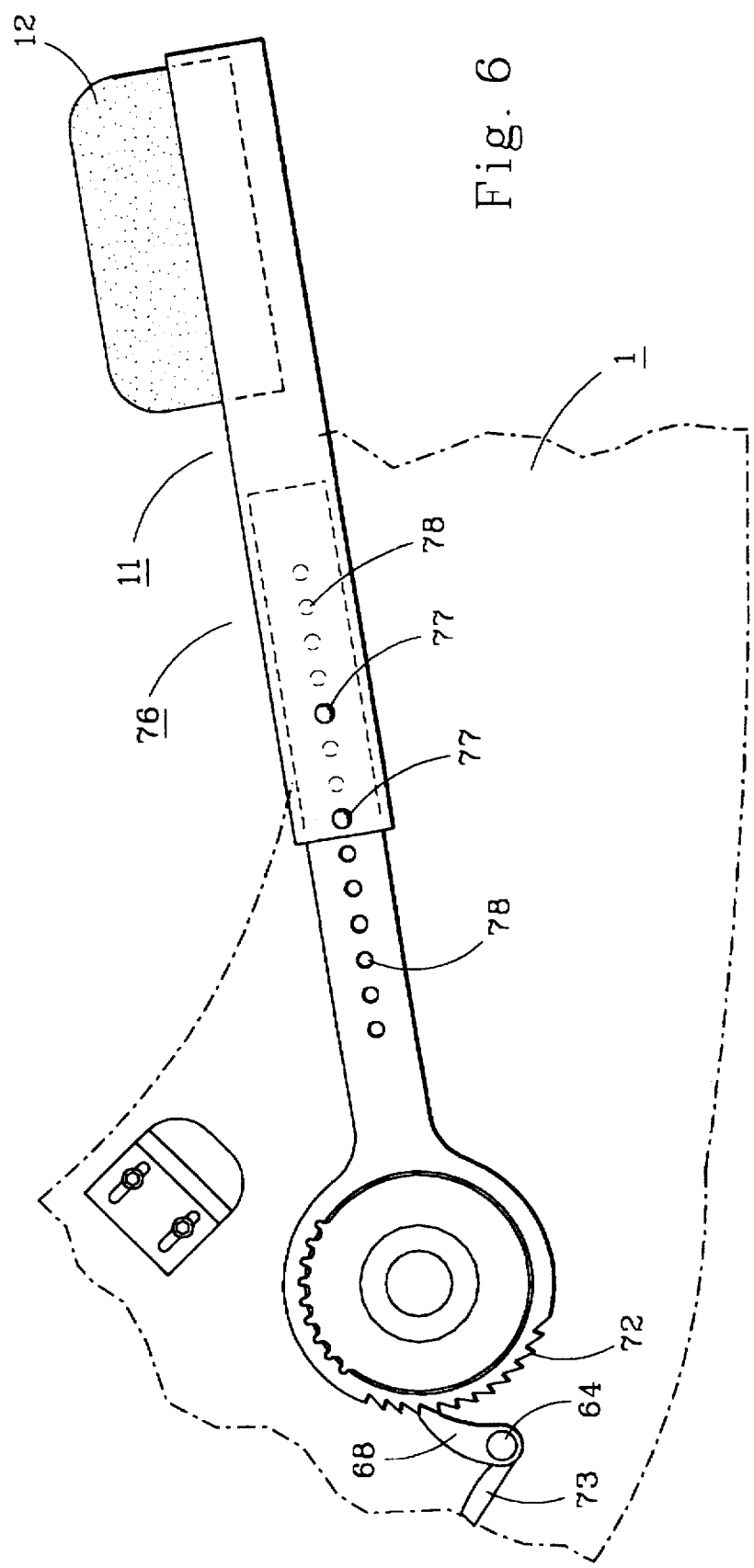
FIG. 6 is a view similar to FIG. 4 showing the impact pad assembly rotated to provide access to the seat portion of the vehicle safety seat.

The lock mechanism is also used to hold impact pad assembly 10 at a retracted position to provide better access to the seat portion 3 when placing a child within the safety seat. Referring to FIG. 6, the impact pad assembly 10 is shown rotated to a position that provides a more open seat access for placing a child in the vehicle safety seat. The "U" shaped impact pad 11 is rotated to a position where the pawls 68 engage the lock teeth 72 and lock the padded portion 12 at a comfortable position for placing a child within the seat. The pawls hold the biased impact pad assembly at the locked position, and the operator is able to use two hands to place the child in the seat. The locking mechanism is then disengaged using the lever 73, and the impact pad assembly is permitted to rotate back to the riding position.

FIG. 7 shows an equivalent embodiment for providing access to the seat portion is illustrated in FIG. 7 where the stops 63 in the siderail 5 and 6 are depressed into the siderails to enable the arms 13 and 14 of the impact pad assembly 10 to bypass the stops and rotate the padded portion 12 to a position above the safety seat 1. This arrangement will also provide improved access to the seat portion 3 when the "U" shaped member is raised above the seat.

Referring to FIG. 8 of the drawings, a further alternate embodiment is shown comprising a padded portion 12 having a soft, compressible amusement device 74, attached to the padded portion to entertain a child riding in the safety seat 1. The amusement simulates a steering wheel, however, the amusement device can comprise any soft compressible shape such as an animal, a game, or the like, without departing from the scope of this invention.

Referring FIGS. 1, 3 and 5, with the safety seat 1 fastened to a passenger seat 8 in an automobile, train, airplane or a boat, the biased pivot mechanism 17 is adjusted to apply a continuous force to rotate the impact pad assembly 10 at a measured force appropriate for the size and weight of the child riding in the vehicle safety seat. To adjust the continuous bias force, hubs 29 and 30 are pushed inward as shown by the direction arrows 75 in FIG. 5. The hubs are pushed inward by applying, a force against the outside "press surface" 31 and 32 of the hubs, and the applied force causes the spring washers 61 and 62 to compress. This allows the hubs to move inward, toward the siderails 5 and 6. As the hubs are pushed inward, the hub teeth 35 and 36, are disengaged from the teeth 37 and 38 of the ring sections 21 and 22 of arms 13 and 14. The hubs are then rotated in either a clockwise or counter clockwise direction to change the alignment of the hub teeth with the teeth in the ring section. Rotating the hubs causes the attached pivot-bar to rotate and thereby either increase or decrease torsion spring tension which in turn chances the amount of continuous force applied to the pivot-bar 41. The hubs are released and the spring washers 61 and 62 force the hubs to move outward to engage the newly aligned teeth and thereby locking the hubs 29 and 30 at a new rotated position within the openings 25 and 26 in the ring sections.

With the bias mechanism adjusted to a measured continuous bias force for the size child riding in the safety seat, the impact pad assembly 10 is either rotated to either of the two positions shown in FIGS. 6 and 7 to provide better access to the seat portion 3 for placing the child within the seat. The child is fastened within the seat using the harness provided, and the impact pad assembly is rotated back to the riding position with the padded portion 12 proximate the child at a 45° angle as shown in FIGS. 1 and 3. As shown in FIG. 6, the arms of the "U" shaped member 11 can include a telescopic arrangement 76 to either lengthen or shorten the arms 13 and 14 to better position the padded portion 12 with respect to the child riding in the safety seat 1. In this instance the telescopic arms are adjusted a length by inserting, lock pins 77 in any of the apertures 78 provided in the arms.

In the event of a sudden deceleration caused by slamming on the breaks at a high speed, or in the event of a front end collision, or in the case of any other type vehicular event that causes the child "C" to be thrown in a forward direction, the head and/or torso of the child impacts upon the impact area 20 of the padded portion 12 as illustrated in FIG. 2 of the drawings. If the force of the impacting child upon the padded portion 12 is less than the measured force selected to bias the impact pad assembly 10 toward the riding position, the multi-density padding 19 provides a soft glove like pocket that cushions the impacting child. The multi-density padding provides a gradual increase in pad density in a direction away from the impacting, head, and the increasing density provides a "low impact" pad that more gently absorbs the shock of impact and reduces the likelihood of a concussion, fracture or closed head injury (CHI).

When child "C" impacts against the padded portion 12 at a force that is greater than the measured force selected to bias the impact pad assembly 10 toward the riding, position, the impact pad assembly 10 rotates away from the force of impact and thereby reduces the shock of impact. As the impacting head continues to rotate the impact pad assembly toward the impact position, the torsion spring tension is increased causing the bias mechanism 17 to apply a gradual increasing force in the opposite direction that slows the rotating, impact assembly to a stopped impact position. The rotation of the padded portion 12 in a direction away from the impact force in combination with the gradual slowing of rotation toward the stopped impact position further reduces the likelihood of a concussion, fracture or CHI during a vehicular event.

As the impact pad assembly rotates in response to the impact force of the child's head upon the padded portion 12, pawls 68 of the lock mechanism engage the lock teeth 72. This locks the rotated impact assembly 10 at the stopped impact position and prevents the bias mechanism 17 from causing pad spring-back toward the riding position. Such pad spring-back could cause serious injury to a child riding in the safety seat.

While this invention has been described as having a preferred design, it should be understood that when the preferred embodiment illustrates and teaches the use of a bias mechanism that comprises two torsion sprints and two adjustments and two lock arrangements, the bias mechanism could just as well comprise a single torsion spring, a single adjustment and a single lock to bias, adjust and lock the impact pad assembly 10 without departing from the scope of this invention. And it should be further understood that the invention is capable of further modifications, uses, and/or adaptations which follow in general the principle of the invention and includes such departures from the present disclosure as come within known or customary practice in the art to which the invention pertains and that may be applied to the central features hereinbefore set forth and fall within the scope of the limits of the appended claims.

I claim:

1. In a safety seat including a seat portion defined by siderails, a harness arrangement to releasably restrain an occupant in the safety seat, and means to attach the safety seat to a vehicle seat, an improved impact pad apparatus, the improvement comprising:

a) an impact pad assembly rotatably attached to the safety seat, said impact pad assembly being rotatable toward a riding position and toward an impact position;

b) a bias means that applies a continuous force to rotate said impact pad assembly toward said riding position; and c) a lock means that engages said impact pad assembly when said impact pad assembly is rotated to said impact position, said lock means preventing said bias means from rotating said impact pad assembly toward said riding position.

2. The invention recited in claim 1 wherein said impact pad assembly includes a bias adjustment mechanism to increase or decrease said continuous force continuously applied to rotate said impact pad assembly.

3. The invention recited in claim 1 wherein said bias means includes at least one spring to apply said continuous force to rotate said impact pad assembly toward said riding position.

4. The invention recited in claim 1 wherein said impact pad assembly comprises:
 a) an impact member including a first arm, a second arm, and a padded portion extending between said first arm and said second arm; and
 b) a pivot-bar rotatably supported in and extending outward from the safety seat, said pivot-bar having a first end fastened to said first arm and a second end fastened to said second arm, said continuous force being applied to said pivot-bar in a direction to rotate said impact pad assembly toward said riding position.

5. The invention recited in claim 4 wherein said lock means comprises:
 a) a lock-bar rotatably attached to and extending outward from the safety seat;
 b) at least one pawl attached to said lock-bar;
 c) lock teeth extending outward from said impact member so that when said impact member is rotated said at least one pawl engages said lock teeth.

6. The invention recited in claim 5 wherein said lock means includes a spring that rotates said lock bar in a direction to cause said at least one pawl to engage said lock teeth.

7. The invention recited in claim 5 wherein said lock teeth are positioned at a location on said impact member whereby said pawl will only engage said lock teeth when said impact member is rotated to a predetermined position.

8. The invention recited in claim 5 wherein said predetermined position is calculated to engage said a least one pawl with said lock teeth when said impact pad assembly is rotated to said impact position.

9. The invention recited in claim 4 wherein said bias means includes:
 a) at least one torsion spring fastened to the safety seat and fastened to said pivot-bar, said torsion spring applying said continuous force against said pivot-bar; and
 b) at least one hub attached to one end of said pivot-bar, said at least one hub being shaped to fit within at least one ring section formed in said impact member, said at least one hub frictionally engaging said at least one ring section to transfer said continuous force to said impact member.

10. The invention recited in claim 9 wherein said bias means includes:
 a) at least one stop located to engage said impact member when said impact pad assembly is rotated by said continuous force to said riding position, said riding position placing said padded portion proximate the occupant, said padded portion positioned at an angle of between about 30° to 60°.

11. The invention recited in claim 10 where said padded portion is positioned at an angle of about 45°.

12. The invention recited in claim 9 wherein said bias adjustment mechanism comprises:
 a) at least one hub attached to one end of said pivot-bar and including a hub retainer that encircles said pivot-bar to provide a sliding connection along the length thereof, said at least one hub being fastened to rotate with said pivot-bar, and said at least one hub being shaped to fit within and frictionally engage at least one ring section formed in said impact member, said frictionally engaged hub transferring said continuous force from said pivot-bar to said impact member when said pivot-bar is rotated; and
 c) a spring positioned between a spring retainer out and said at least one hub, said spring applying an outward force against said hub to maintain said friction engagement with said ring section, and said spring being compressible in response to an inward force applied against said at least one hub, whereby said sliding connection enables said hub to slide along said pivot-bar and disengage from said ring section when said spring is compressed so that said hub and attached pivot-bar can be rotated in a direction to either increase or decrease said continuous force applied by said at least one torsion spring.

13. The invention recited in claim 12 wherein said ring section includes teeth that frictionally engage at least one tooth extending outward from said at least one hub.

14. The invention recited in claim 12 wherein said spring positioned between said spring retainer and said at least one hub is a plurality of spring washers.

15. The invention recited in claim 12 wherein said hub retainer is captured within a reduced diameter length along said pivot-bar to slidably fasten said at least one hub to said pivot-bar.

16. The invention recited in claim 15 wherein when said at least one hub and attached pivot-bar are rotated to cause at least one tooth of said hub to engage different teeth of said ring section and thereby either increase or decrease said continuous force applied by said at least one torsion spring.

* * * * *